United States Patent
Ulloa-Sanzo et al.

(10) Patent No.: US 8,862,071 B2
(45) Date of Patent: Oct. 14, 2014

(54) RADIOCOMMUNICATION SYSTEM FOR AIRCRAFT

(75) Inventors: Julia Ulloa-Sanzo, Colomiers (FR); Rene Ceccom, Saiguede (FR); Claude Pichavant, Toulouse (FR); Christophe Oberti, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 947 days.

(21) Appl. No.: 12/282,038

(22) PCT Filed: Mar. 29, 2007

(86) PCT No.: PCT/FR2007/000540
§ 371 (c)(1),
(2), (4) Date: Sep. 8, 2008

(87) PCT Pub. No.: WO2007/118972
PCT Pub. Date: Oct. 25, 2007

(65) Prior Publication Data
US 2009/0023394 A1    Jan. 22, 2009

(30) Foreign Application Priority Data
Apr. 4, 2006 (FR) ...................................... 06 02917

(51) Int. Cl.
*H04B 1/38* (2006.01)
*H04B 7/185* (2006.01)

(52) U.S. Cl.
CPC ................................. *H04B 7/18506* (2013.01)
USPC .................................... 455/73; 455/98; 701/3

(58) Field of Classification Search
USPC .......................................... 455/73, 98; 701/3
See application file for complete search history.

(56) References Cited

U.S. PATENT DOCUMENTS

| | | | |
|---|---|---|---|
| 4,739,335 A * | 4/1988 | Fourmaud et al. | 714/10 |
| 6,353,779 B1 * | 3/2002 | Simon et al. | 701/3 |
| 6,721,559 B1 * | 4/2004 | Kocin et al. | 455/431 |
| 2002/0003790 A1 * | 1/2002 | Heppe et al. | 370/338 |
| 2002/0004411 A1 | 1/2002 | Heppe | |
| 2002/0032006 A1 | 3/2002 | Nair | |
| 2002/0119758 A1 | 8/2002 | Gouillou | |
| 2002/0155833 A1 | 10/2002 | Borel | |

(Continued)

FOREIGN PATENT DOCUMENTS

| | | |
|---|---|---|
| EP | 1 249 814 | 10/2002 |
| FR | 2 787 658 | 6/2000 |

(Continued)

OTHER PUBLICATIONS

Arinc Specification 429 Part 1-17, Published: May 17, 2004, Published by Aeronautical Radio, Inc., 2551 Riva Road, Annapolis, Maryland 21401, located at http://read.pudn.com/downloads111/ebook/462196/429P1-17_Errata1.pdf.*

(Continued)

*Primary Examiner* — Gennadiy Tsvey
(74) *Attorney, Agent, or Firm* — Dickinson Wright PLLC

(57) ABSTRACT

Radiocommunication system for aircraft. The radiocommunication system (S1) comprises a single box and, integrated into this single box, at least one single main interface module (7), which is formed in such a way as to carry out the processing of the interfaces of all the radiocommunication means (3 to 6) of said radiocommunication system (S1).

4 Claims, 4 Drawing Sheets

(56) References Cited

U.S. PATENT DOCUMENTS

| | | | |
|---|---|---|---|
| 2003/0091063 A1* | 5/2003 | Lipp | 370/464 |
| 2005/0088362 A1* | 4/2005 | Lin et al. | 343/876 |
| 2006/0033659 A1* | 2/2006 | Strickland | 342/372 |
| 2006/0046715 A1* | 3/2006 | Burgemeister | 455/431 |
| 2007/0129854 A1* | 6/2007 | Sandell et al. | 701/3 |

FOREIGN PATENT DOCUMENTS

| | | |
|---|---|---|
| WO | 01/86836 | 11/2001 |
| WO | 01/86893 | 11/2001 |
| WO | 02/30007 | 4/2002 |

OTHER PUBLICATIONS

Arinc Characteristic 758-2, Published: Mar. 25, 2005, Published by Aeronautical Radio, Inc., 2551 Riva Road, Annapolis, Maryland 21401.*

International Search Report dated Aug. 16, 2007 w/ English translation.

Written Opinion of the International Searching Authority with English translation, Apr. 10, 2008.

* cited by examiner

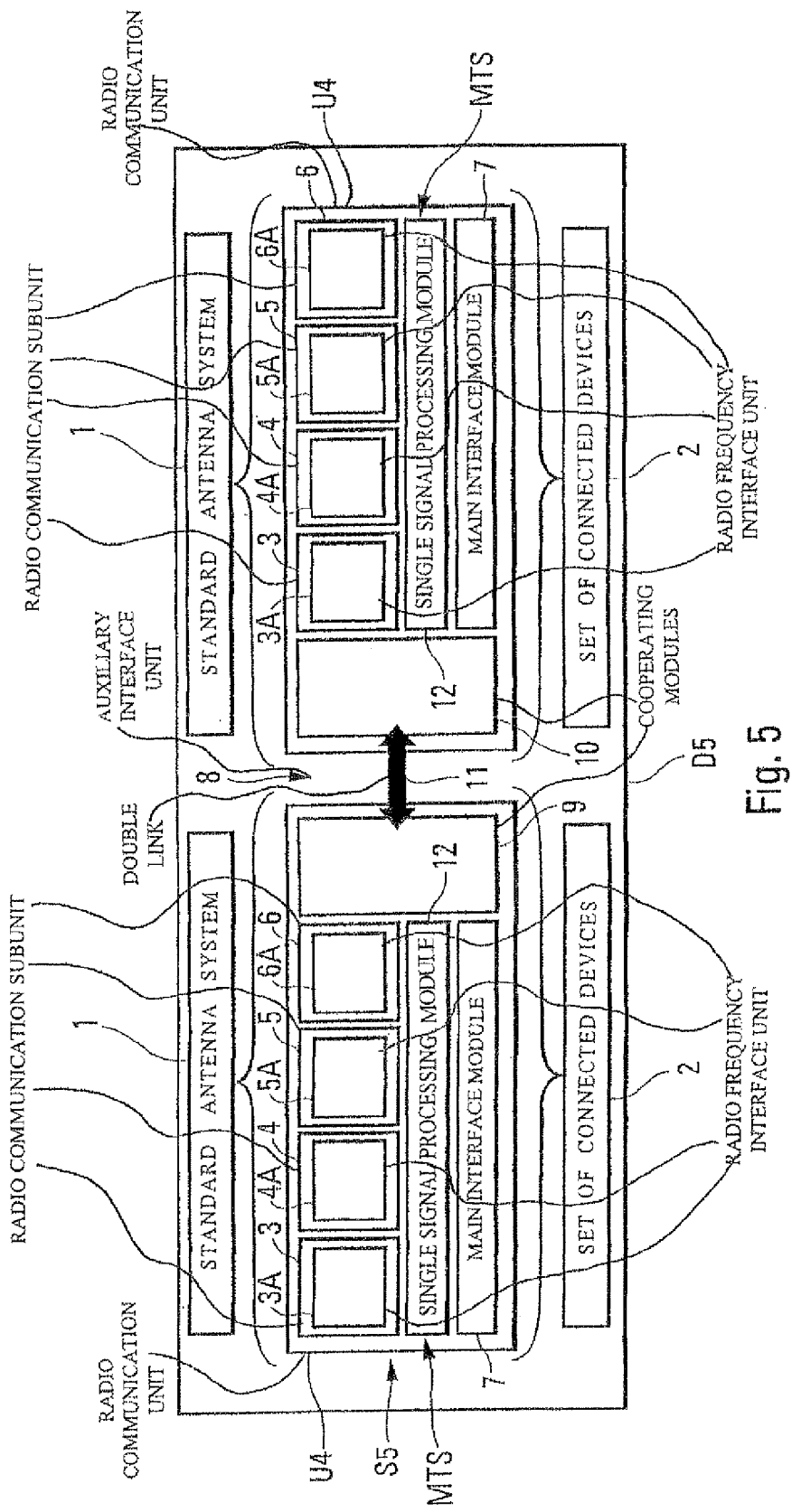

RADIOCOMMUNICATION SYSTEM FOR AIRCRAFT

FIELD OF THE INVENTION

The present invention relates to a radiocommunication system for an aircraft, in particular for a transport airplane.

BACKGROUND OF THE RELATED ART

This radiocommunication system is intended for radiocommunications (of the ground/flight type and/or of the flight/flight type) from the cockpit of the aircraft. It is known that the radiocommunication means of the cockpit of an aircraft are, normally, divided up into a plurality of separate units of LRU (Line Replaceable Unit) type.

It is also known that the requirements of ground/flight and flight/flight communication means are rapidly expanding. The saturation of the radiocommunication spectrum means that new radiofrequency means have to be developed. Furthermore, in addition to voice communications, we are also witnessing an increase in the need for data transmission, and at increasingly higher speeds. To this can be added the requirements of availability and redundancy of these radiocommunication means, which are becoming stricter and stricter. The usual standards demand, in particular, the segregation of the electrical power supply sources between the various radiocommunication means and require at least one radiocommunication means to always remain active at all times. When the radio wave usage range constraints are added, these requirements mean that several systems of the same type have to be on board to provide redundancy. Despite this, there is still a risk that the crew of the aircraft is left without available radiocommunication means on board, in the event of an in-flight failure of these radiocommunication means following an electrical failure.

All these requirements therefore entail considerably increasing the number of onboard devices. This presents numerous drawbacks, in particular causing an increase:
 in weight,
 in allocated space,
 in electrical consumption,
 in ventilation requirements,
 in interfaces to control devices in the cockpit, and
 in complexity in the maintenance tasks.

SUMMARY OF THE INVENTION

The present invention relates to a radiocommunication system for aircraft, which provides a way of remedying the abovementioned drawbacks.

To this end, according to the invention, said radiocommunication system is noteworthy in that it comprises at least one and no more than two radiocommunication units integrated each time in a corresponding single box, and in that each of said radiocommunication units comprises:
 the set of radiocommunication means of the cockpit of the aircraft, which are intended for voice transmission and digital data transmission, each of said radiocommunication means comprising a radiofrequency interface means and being able to be used in transmit and receive modes;
 signal processing means which are associated with said radiofrequency interface means; and
 a main interface module which is unique and which is constructed in such a way as to handle the processing of the interfaces of all said radiocommunication means, by handling the acquisition and sending of signals to at least one device external to said radiocommunication system.

Thus, thanks to the invention, all the radiocommunication means of the cockpit are integrated in a single box which also includes, in particular, a single main interface module. Consequently, by simplifying installation (as specified hereinbelow) and by integrating in particular all the radiocommunication functions of the cockpit in a single box, the security and reliability of the radiocommunication system is increased. As also specified hereinbelow, advantages are thus obtained in terms of size, weight, electrical consumption, equipment maintenance and upgradeability.

Advantageously, said set of radiocommunication means comprises:
 at least one very high frequency radiocommunication means;
 at least one high frequency radiocommunication means; and
 at least one satellite radiocommunication means.

In a first embodiment, said radiocommunication system comprises a single radiocommunication unit (of the abovementioned type) which is interfaced with existing antenna systems and which includes the same interfaces with the equipment of the aircraft as the usual radiocommunication systems. In this case, the functions are integrated in said main interface module which handles the processing of the interfaces between the radiocommunication means and the equipment of the aircraft that is external to said radiocommunication system.

Furthermore, in a second embodiment, said radiocommunication system comprises two separate radiocommunication units which are integrated in said single box. This makes it possible to increase the security and reliability of the radiocommunication system according to the invention.

In this second embodiment, the radiocommunication system includes, in a first embodiment variant, duplicated connections between similar elements of said two radiocommunication units. This first embodiment variant is particularly simple, but it does, however, present certain drawbacks (more cables to be installed and connections to be managed, increased sensitivity to line losses, increased sensitivity to interference).

Thus, to overcome these drawbacks, said radiocommunication system comprises, in a second embodiment variant, an auxiliary interface unit (preferably including two cooperating modules respectively mounted on the two radiocommunication units) which is constructed in such a way as to create an interface between the two radiocommunication units, by enabling information transmissions between these two radiocommunication units. In this second embodiment variant, the number of connections to be made, and the lengths of these connections, are significantly less than those of the abovementioned first embodiment variant, which provides a way of remedying the abovementioned installation problems. Furthermore, this second embodiment variant enables, for example, equipment that is connected to a first of said radiocommunication units to use an antenna that is connected to the second radiocommunication unit, and vice-versa, which increases the flexibility of use of the resources available in normal situations, and in the event of failure offers more than what is demanded by the regulations.

Moreover, in a particular embodiment (equally applicable to said abovementioned first embodiment and to said abovementioned second embodiment), said signal processing means (of a radiocommunication unit) form part of a single signal processing module, which is common to said set of radiocommunication means of said radiocommunication unit. This signal processing module is constructed in such a way as to enable parallel processing of a plurality of different signals. This enhances the availability of the resources and the robustness of the radiocommunication system with respect to failures. It will be noted that a signal processing module can process several signals at the same time, namely signals from its own interfaces and/or signals from the other radiocommunication unit. Thus, for example, the failure of a processor within a module does not prevent the signals being processed, because said signals can be processed by the other processors of the radiocommunication unit concerned or by the other radiocommunication unit.

In this case, the radiofrequency interface means of the different radiocommunication means are constructed in such a way as to convert a received radio signal into a common signal with the same characteristics, regardless of the radiocommunication means. This common signal is then processed in said single signal processing module.

Moreover, in a particular embodiment (applicable to all the abovementioned embodiments), said radiocommunication system also includes internal failure processing means, which perform an automatic reconfiguration of said radiocommunication system on an internal failure such that the latter retains a maximum number of functions.

The present invention also relates to a radiocommunication device of the type comprising:
an antenna system;
a radiocommunication system; and
a set of connected devices.

According to the invention, this radiocommunication device is noteworthy in that said radiocommunication system is such as that specified above.

It will be noted that the integration (specified hereinabove and in accordance with the invention) of the radiocommunication devices provides a way in particular of obtaining the following advantages:
a reduction in volume greater than 30% concerning electronic equipment;
a reduction in weight greater than 30%;
a reduction in electrical consumption greater than 25%;
an increased availability of the radiocommunication means, since the common resources can be assigned at each instant to the desired radiocommunication means;
a higher reliability compared to a standard radiocommunication system architecture (comprising a plurality of radiocommunication means and associated modules that are independent of each other); and
easier maintenance, because in theory one and the same technology is used, originating from one and the same supplier, for all the radiocommunication means.

Furthermore, with the radiocommunication system according to the invention, a user retains the same simultaneous communication capabilities as for a standard radiocommunication system, with no additional transmission and reception constraint.

BRIEF DESCRIPTION OF THE DRAWINGS

The figures of the appended drawing will clearly show how the invention can be implemented. In these figures, identical references denote similar elements.

FIGS. 1 to 5 are block diagrams of a plurality of different embodiments of a radiocommunication device according to the invention.

DETAILED DESCRIPTION OF THE INVENTION

Figure 1:
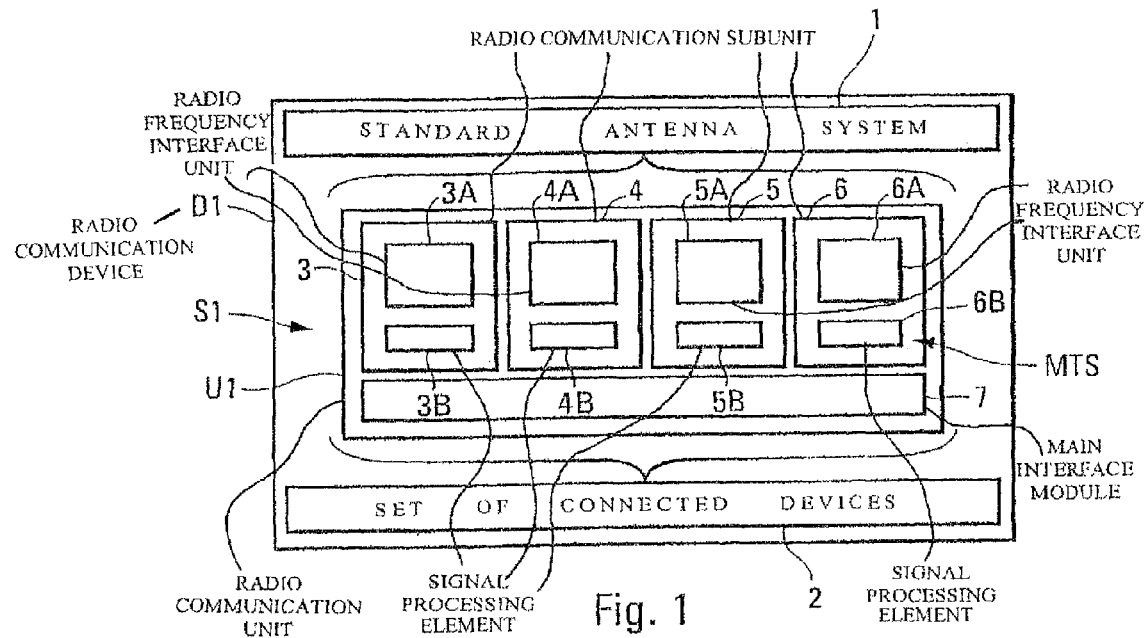

The radiocommunication device D1 to D5 according to the invention and represented in FIGS. 1 to 5 is intended for radiocommunications of the ground/flight type and/or of the flight/flight type, from the cockpit of an aircraft, in particular of a transport airplane.

Usually, such a radiocommunication device D1 to D5 which is on board the aircraft comprises:
at least one standard antenna system 1;
a radiocommunication system S1 to S5; and
at least one set 2 of connected devices of the usual types, in particular aircraft systems.

According to the invention, said radiocommunication system S1 to S5 comprises at least one and no more than two radiocommunication units U1 to U4 integrated each time in a corresponding single box (not represented). Furthermore, according to the invention, each of said radiocommunication units U1 to U4 comprises:
the set of radiocommunication means 3, 4, 5 and 6 of the cockpit of the aircraft, which are intended for voice transmission and for digital data transmission. The term "transmission" should be understood to mean both transmission and reception. Each of said radiocommunication means 3 to 6 comprises a standard radiofrequency interface means 3A, 4A, 5A, 6A, which is integrated, and is therefore able to be used in both transmit and receive modes;
signal processing means MTS specified hereinbelow, which are associated with said radiofrequency interface means 3A to 6A; and
a main interface module 7 which is common to said radiocommunication means 3 to 6 and which is constructed in such a way as to handle the processing of the interfaces of all these radiocommunication means 3 to 6, by handling the acquisition and sending of signals to at least one device which is internal to said radiocommunication device D1 to D5 (and which is part of said set 2). This process in particular requires impedance matching and electrical level control of the input and output electrical signals, and protection against overloads of the physical interfaces.

Thus, thanks to the invention, all the radiocommunication means 3 to 6 of the cockpit are integrated in a single box which also comprises, in particular, a single main interface module 7. Consequently, by simplifying the installation of the radiocommunication system S1 to S5 (as specified hereinbelow) and by integrating in particular all the radiocommunication functions of the cockpit in a single box, the security and the reliability of said radiocommunication system S1 to S5 is increased. Other advantages are also obtained in terms of size, weight, electrical consumption, equipment maintenance and upgradeability.

In a particular embodiment, said set of radiocommunication means 3, 4, 5 and 6 comprises:
at least one very high frequency radiocommunication means 3, of the VDR type (VDR standing for VHF Data Radio and VHF standing for Very High Frequency), with the following characteristics: frequency band: 118.000 to 136.975 MHz with a spacing of 8.33 kHz (voice mode) or of 25 kHz (voice or data) between the channels;
at least one high frequency radiocommunication means 4, of HFDR type (HFDR standing for HF Data Radio, and HF standing for High Frequency), with the following characteristics: frequency band: 2.8000 to 23.9999 MHz with a spacing of 1 kHz between the channels (voice mode), and frequency band: 2.000 to 29.9999 MHz with a spacing of 100 Hz between channels (data mode);
a possible particular radiocommunication means 5. This can be in particular free resources reserved in the radiocommunication system in order to be able to implement new radiocommunication means at a later date. These free resources concern, for example, the future short range broadband communication means in the VHF band (like the systems based on the B-VHF or IS-95 techniques) or also in the L band, like, for example, the systems based on the CDMA or DS-CDMA or 802.16a/20 (UMTS connections) techniques. It can also be free resources for VDL Mode 4 and NexSAT systems, even if these free resources can be integrated in the radiocommunication means already used and may not require a separate radiocommunication means; and at least one satellite radiocommunication means 6, of the SATCOM (SATellite COMmunication) type, having the following characteristics: frequency band L: 1525.0 to 1660.5 MHz.

In a preferred embodiment, said radiocommunication system S1 to S5 comprises three very high frequency radiocommunication means 3, two high frequency radiocommunication means 4, two particular radiocommunication means 5 (or free positions), and one satellite radiocommunication means 6.

In the first embodiment represented in FIG. 1, said radiocommunication system S1 comprises a single radiocommunication unit U1 of the abovementioned type, which is interfaced with an existing antenna system 1 and which has the same interfaces with equipment of the aircraft as the usual radiocommunication systems. To this end, each radiocommunication means 3 to 6 includes an individual processing element 3B to 6B, said individual processing elements 3B to 6B forming said signal processing means MTS. In this first embodiment, the functions are integrated in said main interface module 7 which handles the processing of the interfaces between the radiocommunication means 3 to 6 and of the equipment of the aircraft that is external to said radiocommunication system and which is part of said set 2.

Figure 2:
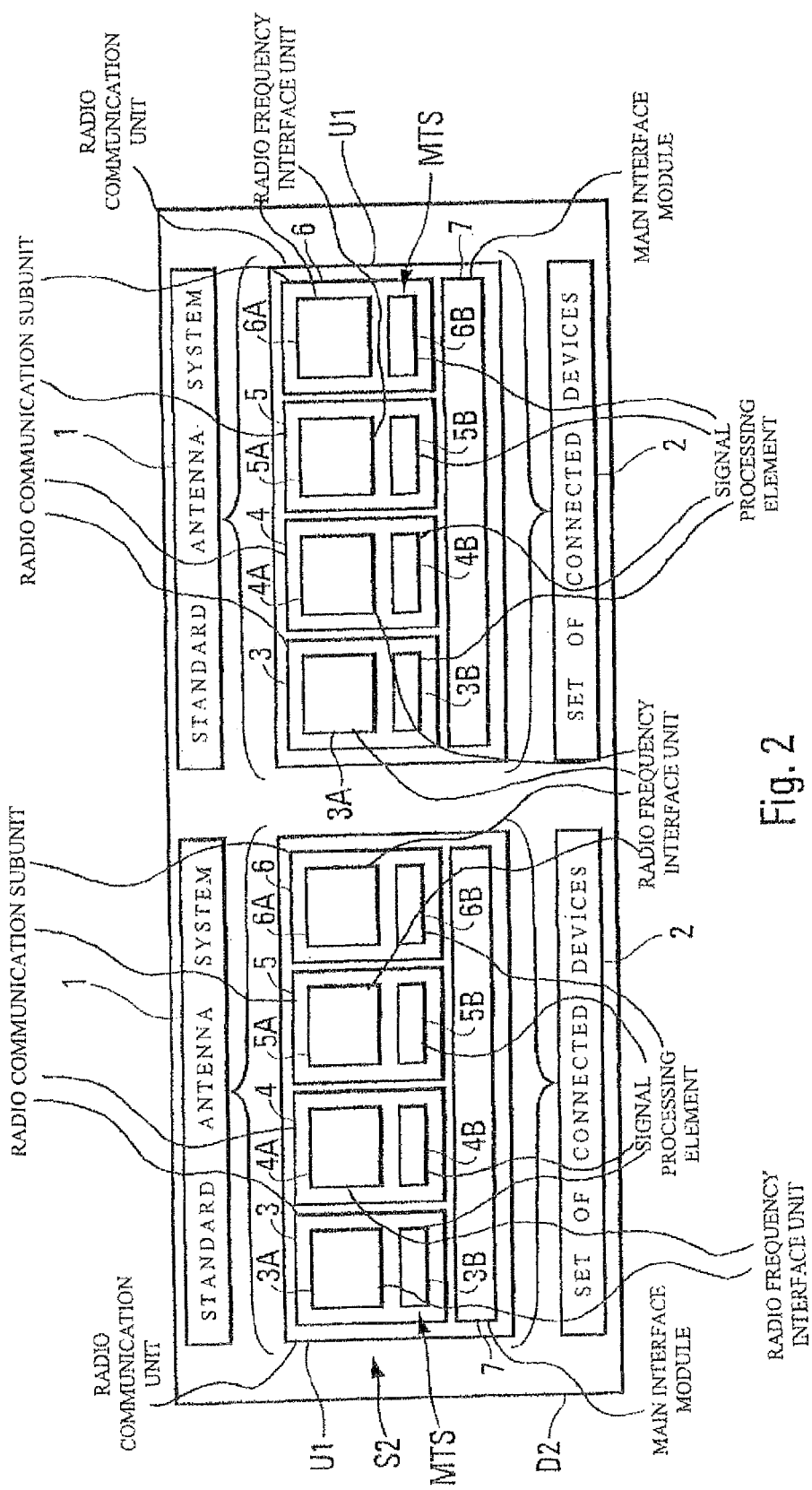

Furthermore, particularly to increase security and reliability, said radiocommunication system S2 includes, in a particular embodiment represented in FIG. 2, two radiocommunication units U1 which are, for example, independent and similar to that of the radiocommunication system S1 of FIG. 1. This provides for a redundant radiocommunication system S2.

Furthermore, to increase the flexibility of this latter embodiment, the radiocommunication system S2 can include duplicated connections (not represented) between similar elements of said two radiocommunication units U1. This embodiment is particularly simple, but it does, however, present certain drawbacks (more cables to be installed and connections to be managed, increased sensitivity to line losses, increased sensitivity to interference).

Figure 3:
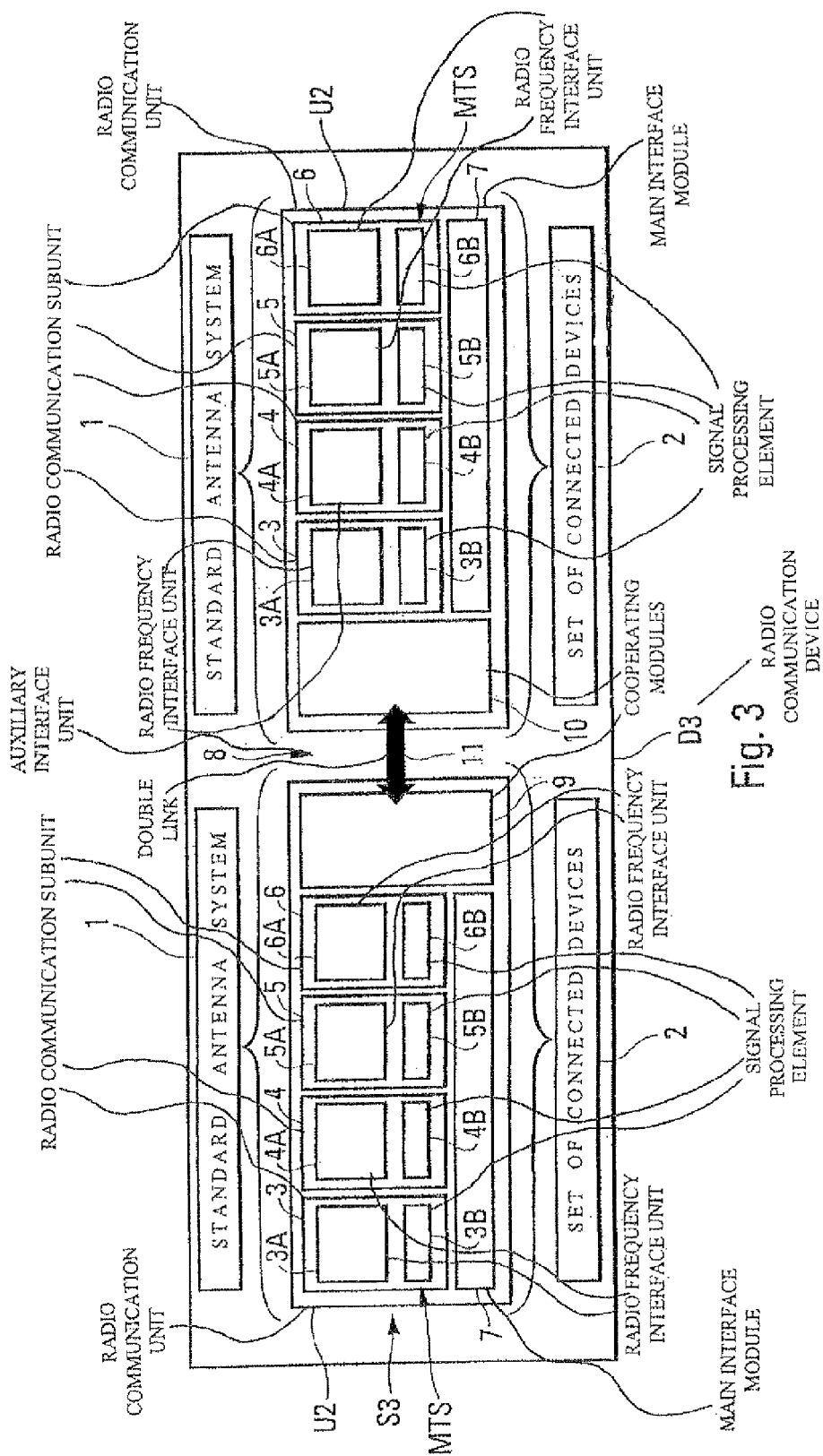

Thus, to remedy these drawbacks, said radiocommunication system includes, in another embodiment S3 represented in FIG. 3, an auxiliary interface unit 8 (preferably comprising two cooperating modules 9 and 10 which are respectively mounted on the two radiocommunication units U2) which is constructed in such a way as to create an interface between the two radiocommunication units U2, by enabling information transmissions between these two radiocommunication units U2, as illustrated by a double link 11. In this embodiment variant, the number of connections to be made, and the lengths of these connections, are significantly less than those of the embodiment variant represented in FIG. 2, which overcomes the abovementioned installation problems. Furthermore, this embodiment variant enables, for example, a device that is connected to a first of said radiocommunication units U2 to use an antenna that is connected to the second radiocommunication unit U2, and vice-versa, which increases the flexibility of use of the available resources in normal situations, and in the event of failure allows more than is required by the regulations.

The preceding radiocommunication systems S1, S2, S3 comprise a plurality of individual signal processing elements 3B to 6B which are each time integrated in the corresponding radiocommunication means 3 to 6, which form said means MTS, and which are dedicated to each type of radio signal. This solution is very simple, since each radiocommunication means 3 to 6 has its own signal characteristics (frequency, level, etc.). Furthermore, this solution allows for both analog and digital signal processing.

Figure 4:
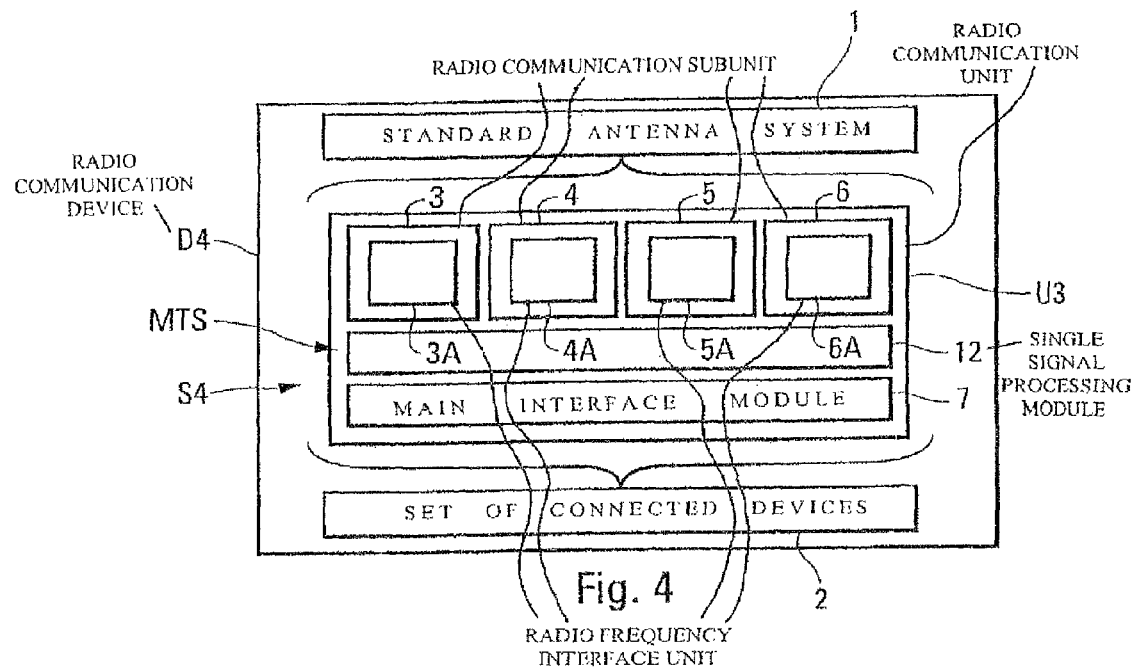

However, to increase the level of integration, in a particular embodiment applicable equally to a radiocommunication system S4 comprising a single radiocommunication unit U3, as represented in FIG. 4, and to a radiocommunication system S5 comprising two radiocommunication units U4, as represented in FIG. 5, said signal processing means MTS (of a radiocommunication unit U3, U4) are part of a single signal processing module 12, which is common to all the radiocommunication means 3 to 6 of said radiocommunication unit U3, U4. This signal processing module 12 is constructed in such a way as to enable parallel processing of a plurality of different signals. This improves the availability of the resources and the robustness of the radiocommunication system S4, S5 against failures. It will be noted that a signal processing module 12 can process several signals at the same time, namely signals from its own interfaces and/or signals from the other radiocommunication unit. Thus, the failure of a processor within a module will not prevent signals being processed, because the latter can be processed by the other processors of the radiocommunication unit concerned or by the other radiocommunication unit.

In this case, the radiofrequency interface means 3A to 6A of the different radiocommunication means 3 to 6 are constructed in such a way as to convert a received radio signal into a common signal with the same characteristics, regardless of the radiocommunication means 3 to 6. This common signal is then processed in said single signal processing module 12.

Moreover, in a particular embodiment, said radiocommunication system S1 to S5 also includes internal failure processing means (not represented), which perform an automatic reconfiguration of said radiocommunication system S1 to S5 in the event of an internal failure such that the latter retains a maximum number of functions.

It will be noted that the integration (specified hereinabove and according to the invention) of the radiocommunication devices in the radiocommunication system S1 to S5 provides in particular for the following advantages:

a reduction in volume greater than 30% concerning electronic equipment;

a reduction in weight greater than 30%;

a reduction in electrical consumption greater than 25%;

an increased availability of the radiocommunication means 3 to 6, since the common resources can be assigned at each instant to the desired radiocommunication means;

regardless of the embodiment concerned, the possibility of providing analog and/or digital interfaces with systems of the aircraft (audio and data);

higher reliability compared to a standard radiocommunication system architecture (comprising a plurality of radiocommunication means and associated modules that are independent of each other); and easier maintenance, because, in theory, one and the same technology is used, originating from one and the same supplier, for all the radiocommunication means 3 to 6.

Furthermore, with the radiocommunication system S1 to S5 according to the invention, a user retains the same simultaneous communication capabilities as for a standard radiocommunication system, with no additional transmission and reception constraint.

The invention claimed is:

1. A radiocommunication device comprising:
   first and a second antenna systems;
   first and second radiocommunication systems in respective communication with said first and second antenna systems;
   first set and second sets of connected devices in respective communication with said first and second radiocommunication systems; and
   an internal failure processing unit configured for automatic reconfiguration of said first and second radiocommunication systems upon an internal failure, in which said first and second radiocommunication systems retain a maximum number of functions,
   wherein
   a) each of said first and second radiocommunication systems is integrated in a box,
   b) the first radiocommunication system comprises a first radiocommunication unit interfaced with the first antenna system and the first set of connected devices,
   c) the second radiocommunication system comprises a second radiocommunication unit interfaced with the second antenna system and the second set of connected devices,
   d) duplicated connections are included between elements of said first and second radiocommunication units, and
   each radiocommunication unit is comprised of:
      i) a plurality of radiocommunication subunits, in which the first radiocommunication unit comprises a first set of the radiocommunication subunits in communication with the first antenna system and the second radiocommunication unit comprises a second set of the radiocommunication subunits in communication with the second antenna system, wherein each radiocommunication subunit is configured for transmission of voice and digital data, each radiocommunication subunit comprises an integrated radiofrequency interface unit configured for both transmit and receive modes and for converting a received radio signal into a common signal, and common resources are assigned at each instant to desired radiocommunication subunits,
      ii) a single signal processing unit in each of the first and second radiocommunication units, in which each single signal processing unit is configured in common with all the radiocommunication subunits to process each common signal received from each integrated radiofrequency interface unit and to parallel process a plurality of different signals from each of the radiocommunication units, wherein the single signal processing unit in the first radiocommunication unit is configured to process signals from each integrated radiofrequency interface unit of the first radiocommunication unit and from each integrated radiofrequency interface unit of the second radiocommunication unit, and the signal processing unit in the second radiocommunication unit is configured to process signals from each integrated radiofrequency interface unit of the second radiocommunication unit and from each integrated radiofrequency interface unit of the first radiocommunication unit,
      iii) a single main interface module in each of the first and second radiocommunication units, in which each single main interface module is configured to acquire each processed common signal from the first and second single signal processing units, respectively, and send signals to at least one device of the first and second sets of connected devices by impedance matching and controlling electrical level of input and output electrical signals, and provide protection against overloading of its physical interfaces, and
      iv) a cooperating module mounted in each radiocommunication unit, with the cooperating modules linked to create an auxiliary interface between the first and second radiocommunication units and transmit information from the first radiocommunication unit to a device in the second set of connected devices and transmit information from the second radiocommunication unit to a device in the first set of connected devices.

2. The radiocommunication device of claim 1, wherein said first set of radiocommunication subunits and said second set of radiocommunication subunits comprise:
   at least one very high frequency radiocommunication subunit;
   at least one high frequency radiocommunication subunit; and
   at least one satellite radiocommunication subunit.

3. An aircraft, comprising the radiocommunication device specified under claim 1.

4. The radiocommunication device of claim 1, wherein said first set of radiocommunication subunits and said second set of radiocommunication subunits comprise:
   1) at least one very high frequency radiocommunication subunit configured for radiocommunication over a frequency band of about 118.000 to 136.975 MHz;
   2) at least one high frequency radiocommunication subunit configured for radiocommunication over a frequency band of about 2.8000 to 23.999 MHz or a frequency band of about 2.000 to 29.999 MHz; and
   3) at least one satellite radiocommunication subunit configured for radiocommunication over a frequency band of about 1525.0 to 1660.5 MHz.

* * * * *